US008983861B2

(12) United States Patent
Wei (10) Patent No.: US 8,983,861 B2
(45) Date of Patent: Mar. 17, 2015

(54) BRIDGE PAGES FOR MOBILE ADVERTISING

(75) Inventor: Xingtao Wei, Coquitlam (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 13/276,672

(22) Filed: Oct. 19, 2011

(65) Prior Publication Data

US 2013/0103498 A1     Apr. 25, 2013

(51) Int. Cl.
| | |
|---|---|
| G06Q 30/00 | (2012.01) |
| G06F 17/30 | (2006.01) |
| G06Q 30/02 | (2012.01) |
| G06Q 10/10 | (2012.01) |

(52) U.S. Cl.
CPC ...... *G06F 17/30905* (2013.01); *G06Q 30/0277* (2013.01); *G06Q 30/0276* (2013.01); *G06Q 30/02* (2013.01); *G06Q 10/10* (2013.01); *G06F 17/30864* (2013.01)
USPC .................................... 705/14.72; 705/14.73

(58) Field of Classification Search
USPC ..................................................... 705/14.64
See application file for complete search history.

(56) References Cited

U.S. PATENT DOCUMENTS

| | | | |
|---|---|---|---|
| 7,003,719 B1 * | 2/2006 | Rosenoff et al. ............... | 715/205 |
| 2005/0256765 A1 | 11/2005 | Lin et al. | |
| 2007/0198339 A1 | 8/2007 | Shen et al. | |
| 2007/0288841 A1 | 12/2007 | Rohrabaugh et al. | |
| 2008/0249833 A1 | 10/2008 | Ali et al. | |
| 2009/0089448 A1 | 4/2009 | Sze et al. | |
| 2010/0099441 A1 | 4/2010 | Agarwal et al. | |
| 2010/0146585 A1 * | 6/2010 | Li et al. ............................ | 726/1 |
| 2010/0217663 A1 * | 8/2010 | Ramer et al. ............... | 705/14.42 |
| 2011/0072086 A1 | 3/2011 | Newsome et al. | |
| 2011/0072096 A1 | 3/2011 | Goldstein et al. | |

FOREIGN PATENT DOCUMENTS

| | | |
|---|---|---|
| CN | 1647094 | 7/2005 |
| CN | 101432771 | 5/2009 |
| CN | 102929986 | 2/2013 |

(Continued)

OTHER PUBLICATIONS

Lupetti, "Tips to design your site for mobile devices", woork.blogspot.com, Jul. 21, 2008, found on line at woork.blogspot.com/2008/07/tips-to-design-your-site-for-mobile.html.*

(Continued)

*Primary Examiner* — John G Weiss
*Assistant Examiner* — Scott C Anderson
(74) *Attorney, Agent, or Firm* — Joann Dewey; Jim Ross; Micky Minhas (57) ABSTRACT

Various embodiments pertain to generating and causing display of a bridge page responsive to a user request for an advertiser's web page when the web page resolution is higher than the screen resolution of the user's device. The bridge page can be, for example, a lower resolution summary of content included on the web page. In various embodiments, the bridge page is generated and hosted by an ad platform server rather than the advertiser server. In at least some embodiments, the bridge page is stored in a database and can be served from the database responsive to subsequent requests for the advertiser's web page.

18 Claims, 5 Drawing Sheets

(56) References Cited

FOREIGN PATENT DOCUMENTS

| JP | 2007102663 A | 4/2007 |
| KR | 1020070116925 A | 12/2007 |

OTHER PUBLICATIONS

"Redirect Mobile Devices", CSS-Tricks, Oct. 1, 2009, found on line at css-tricks.com/snippets/javascript/redirect-mobile-devices/.*

Kristula, "Banner advertising on the web", Dave's Site, Oct. 9, 1996, found on line at davesite.com/internet/webads.shtml.*

"Landing page or redirect—that is the question", Jul. 26, 2007, found on line at cdfnetworks.com/landing-page-or-redirect-that-is-the-question/.*

Berners-Lee, "Hypertext Markup Language—2.0", Network Working Group—Internet Engineering Task Force, Request for Comments No. 1866, Nov. 1995, available on line at ietf.org.*

E-Commerce and Marketing Dictionary of Terms, University of Delaware, Feb. 2006, on line at udel.edu/alex/dicationary.html.*

Chu, "Users with Small Screens—Less than 640×480", Universal Usability in Practice, University of Maryland, Apr. 2001, found on line at otal.umd.edu/uupractice/small_screen/.*

Rappa, "The utility business model and the future of computing services", IBM Systems Journal, vol. 43, No. 1, 2004, pp. 32-42.*

"Bridge Page", Retrieved on: Sep. 13, 2011, Available at: http://adwords.google.com/support/aw/bin/answer.py?hl=en&answer=190435.

"Online-Ads>>What is a "Bridge Page"?", Retrieved on: Sep. 13, 2011, Available at: http://www.o-a.com/archive/1996/Sep./0101.html.

"International Search Report", Mailed Date: Feb. 22, 2013, Application No. PCT/US2012/061164, Filed Date: Oct. 19, 2012, pp. 11.

"Foreign Office Action", CN Application No. 201210399446.7, Nov. 26, 2014, 14 pages.

\* cited by examiner

BRIDGE PAGES FOR MOBILE ADVERTISING

BACKGROUND

Mobile devices, such as smartphones, can be used to access the internet, play games, and perform many tasks in addition to making calls. Some programs or "apps" are available to users for free, but include ads in the form of ad banners that are displayed to the user during the user's interaction with the app. Users can click or otherwise select the link or ad banner to be taken to an advertiser's web page for additional details. The web page can be, for example, the advertiser's home page or a full page advertisement.

When a user views a page on a screen of a mobile device, the page is viewed at a lower resolution than if the page is viewed on a desktop or laptop computer. For example, while a desktop or computer can have a resolution of 1024×768, mobile devices have smaller screens with resolutions around 800×480. Because of the high number of traditional web pages and the cost associated with creating both high resolution and low resolution pages, web pages, including advertiser's web pages, can be shrunk to fit on a smaller device screen rather than creating a dedicated mobile page. The shrunken page, however, can be difficult to read because of small, almost invisible, text size.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to generating and causing display of a bridge page responsive to a user request for an advertiser's web page when the web page resolution is higher than the screen resolution of the user's device. The bridge page can be, for example, a lower resolution summary of the web page. In various embodiments, the bridge page is generated and hosted by an ad platform server. In some embodiments, the bridge page is buffered and can be served from the buffer responsive to subsequent requests for the advertiser's web page.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments pertain to generating and causing display of a bridge page responsive to a user request for an advertiser's web page when the web page resolution is higher than the screen resolution of the user's device. The bridge page can be, for example, a lower resolution summary of content included on the web page. In various embodiments, the bridge page is generated and hosted by an ad platform server rather than the advertiser server. In at least some embodiments, the bridge page is stored in a database and can be served from the database responsive to subsequent requests for the advertiser's web page.

In the discussion that follows, a section entitled "Example Operating Environment" describes an operating environment in accordance with one or more embodiments. Next, a section entitled "Example Embodiment" describes various embodiments in which a bridge page can be generated and displayed responsive to a user request for an advertiser's web page. Finally, a section entitled "Example System" is provided, and describes an example system that can be used to implement one or more embodiments.

Consider now, an example operating environment in accordance with one or more embodiments in which the principles described herein can be employed.

Example Operating Environment

Figure 1:
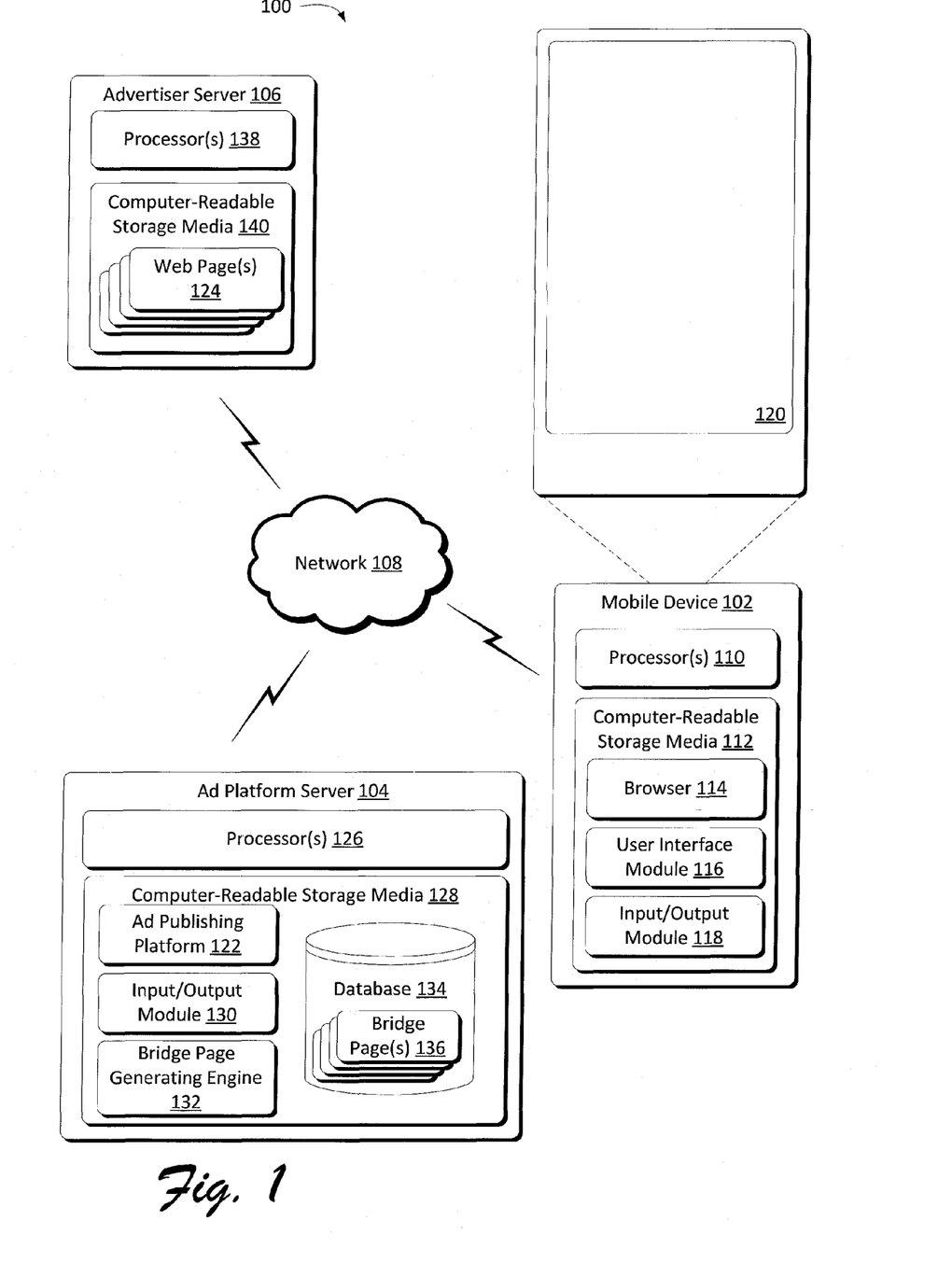
FIG. 1 is an illustration of an example environment in accordance with one or more embodiments.

FIG. 1 is an illustration of an example environment 100 in accordance with one or more embodiments. Environment 100 includes a client device in the form of a mobile device 102, an ad platform server 104, and an advertiser server 106 in communication through network 108. In various embodiments, a user can select an ad banner or link on mobile device 102 which, in turn, requests a page from ad platform server 104 via network 108 as described below in more detail. The client device can be implemented as any suitable type of device, such as a mobile device (e.g., a mobile phone, portable music player, personal digital assistant, dedicated messaging device, portable game device, netbook, tablet, and the like).

In the illustrated and described embodiment, mobile device 102 includes one or more processors 110 and computer-readable storage media 112. Computer-readable storage media 112 can include various software executable modules, including browser 114. The computer-readable storage media also includes a user interface module 116 which is configured to manage user interfaces associated with executable modules that execute on the device and an input/output module 118. Mobile device 102 also includes a display 120 that is configured to display content, such as content accessed via browser 114.

Display 120 may be used to output a variety of content, such as a caller identification (ID), contacts, images (e.g., photos), email, multimedia messages, Internet browsing content, game play content, music, video, and so on. In one or more embodiments, the display 120 is configured to function as an input device by incorporating touchscreen functionality, e.g., through capacitive, surface acoustic wave, resistive, optical, strain gauge, dispersive signals, acoustic pulse, and/or other touchscreen functionality. The touchscreen functionality (as well as other functionality such as track pads) may also be used to detect gestures or other input.

The input/output module 118 communicates via network 108, e.g., to request a web page from a server and to receive displayable information from the server. The input/output module 118 may also include a variety of other functionality, such as functionality to make and receive telephone calls, form short message service (SMS) text messages, multimedia messaging service (MMS) messages, emails, status updates to be communicated to a social network service, and so on. In the illustrated and described embodiment, user interface module 116 can, under the influence of ad publishing platform 122, cause an advertisement banner (ad banner) to be presented to a user. Responsive to viewing the ad banner, the user can indicate a desire to view additional information associated with the ad banner, such as by providing input via an interaction with the ad banner presented on display 120. The mobile device can generate a request that can be sent to the ad platform server 104. In various embodiments, the request is a request for a web page 124 hosted by advertiser server 106.

Ad platform server 104 includes one or more processors 126 and computer-readable storage media 128. Computer-readable storage media 128 includes ad publishing platform 122, input/output module 130, bridge page generating engine 132, and database 134. Ad publishing platform 122 is configured to manage and present advertisements, for example, ad banners, to a user via a user device, such as mobile device 102. In various embodiments, the ad publishing platform 122 is configured to transmit a bridge page 136 instead of a web page, such as when the web page has a resolution greater than the resolution of the display of the requestor. Input/output module 130 is configured to communicate via network 108, e.g., to receive page requests and to transmit advertisements to other devices connected to the network. Bridge page generating engine 132 is configured to generate a bridge page 136 that corresponds to a target web page. In various embodiments, database 134 is configured to store the bridge pages, and to provide the bridge pages for future use.

In practice, ad platform server 104 can be representative of an advertisement management service that serves to cause various advertisements, in the form of ad banners, bridge pages, and web pages, to be displayed to users interacting one or more executable modules on a user device, such as mobile device 102. Ads can be displayed to users via browser 114, or as part of a variety of other executable modules included on a user's device, such as a game or widget to provide information and content. More particularly, ad platform server 104, through input/output module 130, can receive a request from a mobile device, such as mobile device 102, via network 108 and search database 134 for information regarding the web page requested by the user. In particular, the ad publishing platform 122 determines whether the resolution of display 120 matches the resolution of the web page 124 that is associated with the ad banner. If the resolutions match, or if the resolution of the web page 124 is less than the resolution of the display 120, the user is presented web page 124, such as via browser 114.

If, however, the resolution of the web page 124 is greater than the resolution of the display, the ad publishing platform 122 searches database 134 for a bridge page 136 that corresponds to web page 124 that can be returned to the mobile device 102 so that it can be displayed to the user. Bridge pages 136 are generated by bridge page generating engine 132 in response to a request from ad publishing platform 122 for a bridge page corresponding to a particular web page. A bridge page 136 can be, for example, a lower resolution, abstract or summary of a web page 124 associated with an ad banner, enabling a user to preview the web page without the need to swipe, zoom in/out, or pan the page. If, based on the bridge page, the user desires to view the web page 124 in full resolution, the user can indicate this desire, such as by providing input via an interaction with the bridge page 136, and can be redirected to the web page 124. The bridge page generating engine 132 can generate the bridge page based on a map of content from the web page, and the bridge pages 136 can be stored in database 134 for future display.

Advertiser server 106 includes one or more processors 138 and computer-readable storage media 140, on which web pages 124 reside. In various embodiments, ad platform server 104 transmits an ad banner to a mobile device, and a user can indicate a desire to view a web page 124 associated with the ad banner. The content included on web page 124 can be controlled, generated, and modified by the advertiser, such as to provide updated offers or information on products. It should be noted, however, that bridge pages, while generated according to the content on the advertiser's web pages, are generated by bridge page generating engine 132 on ad platform server 104 rather than by the advertisers. In other words, in various embodiments, the server hosting the advertiser's web pages does not generate the bridge page and does not include the database for storing bridge pages.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example environment, consider now a discussion describing creating a bridge page corresponding to a target web page and displaying the bridge page to a user when the resolution of the target web page is greater than the resolution of the user's device.

Example Embodiment

In various embodiments, a bridge page is presented to a user when the resolution of the display for a user's device is less than the resolution of a target web page. As an example, consider FIG. 2 which illustrates an example mobile device 102 with a display 120.

Figure 2:
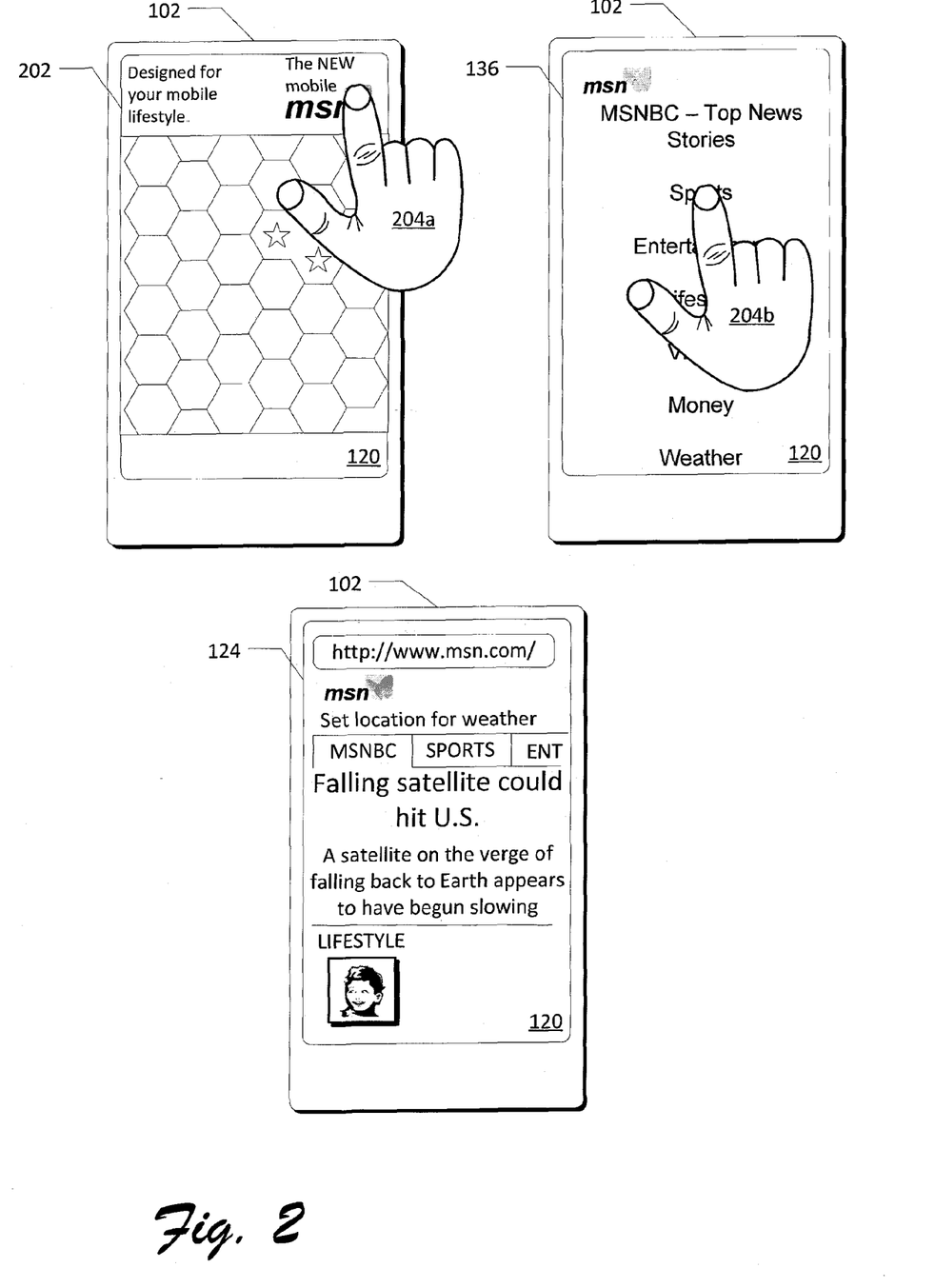
FIG. 2 is an illustration of an example embodiment in which a bridge page is generated and displayed.

Assume in this example that the user is interacting with a first application or executable module whose content is displayed on display 120. The application can be, for example, a game or another service that can employ advertisements to generate revenue. Assume also that an ad platform service is employed to present advertisements in the form of ad banners, such as ad banner 202, to the user during the user's interaction with the application. Any suitable way of presenting the advertisements can be used including, by way of example and not limitation, inserting an ad banner above or below the content of the application, providing an advertisement in the form of text, video, or images at predetermined intervals during the user's interaction with the application, and the like.

When a user is presented with an ad banner 202 that is of interest, the user can interact with the ad banner, such as by touching or otherwise engaging the ad banner, as illustrated by the user's hand 204a. Interactions can also occur via buttons, drop down menus, or other affordances. The user's interaction with the ad banner 202 can transmit a request to the ad platform service for a web page associated with the ad banner to be displayed on display 120.

The ad platform service can receive the request for the web page. The request can also include information on or about mobile device 102, such as information regarding the resolution of display 120. The ad platform service can compare the resolution of the display 120 to the resolution of the web page requested, and when the resolution of the web page requested is greater than the resolution of the display 120, the ad platform service can provide a bridge page 136 to the user.

The bridge page 136 can be, for example, a lower resolution, abstract or summary of the requested web page that is associated with ad banner 202, enabling a user to preview the web page without the need to swipe, zoom in/out, or pan the page. As shown in FIG. 2, the bridge page can be a well-organized, relatively simple, summary of the content on the web page. The make up and characteristics of the bridge page can vary depending on the embodiment, provided the bridge page has a resolution comparable to that of the user device.

If, after viewing the bridge page 136, the user decides to proceed to the web page, the user can interact with the bridge page 136, such as by touching the bridge page 136, as illustrated by the user's hand 204*b*. Interactions can also occur via buttons, drop down menus, or other affordances. The user's interaction with the bridge page 136 can transmit a second request to the ad platform service for the web page to be displayed on display 120.

The ad platform service can receive the second request for the web page. Responsive to the second request for the web page, the ad platform can cause the requested web page to be displayed. For example, the ad platform service can cause a browser, such as browser 114 on the user's mobile device 102, to be redirected to the server hosting the web page 124. The mobile device 102 can receive information from the host of the web page, such as advertiser server 106, and display the web page 124 on display 120.

Figure 3:
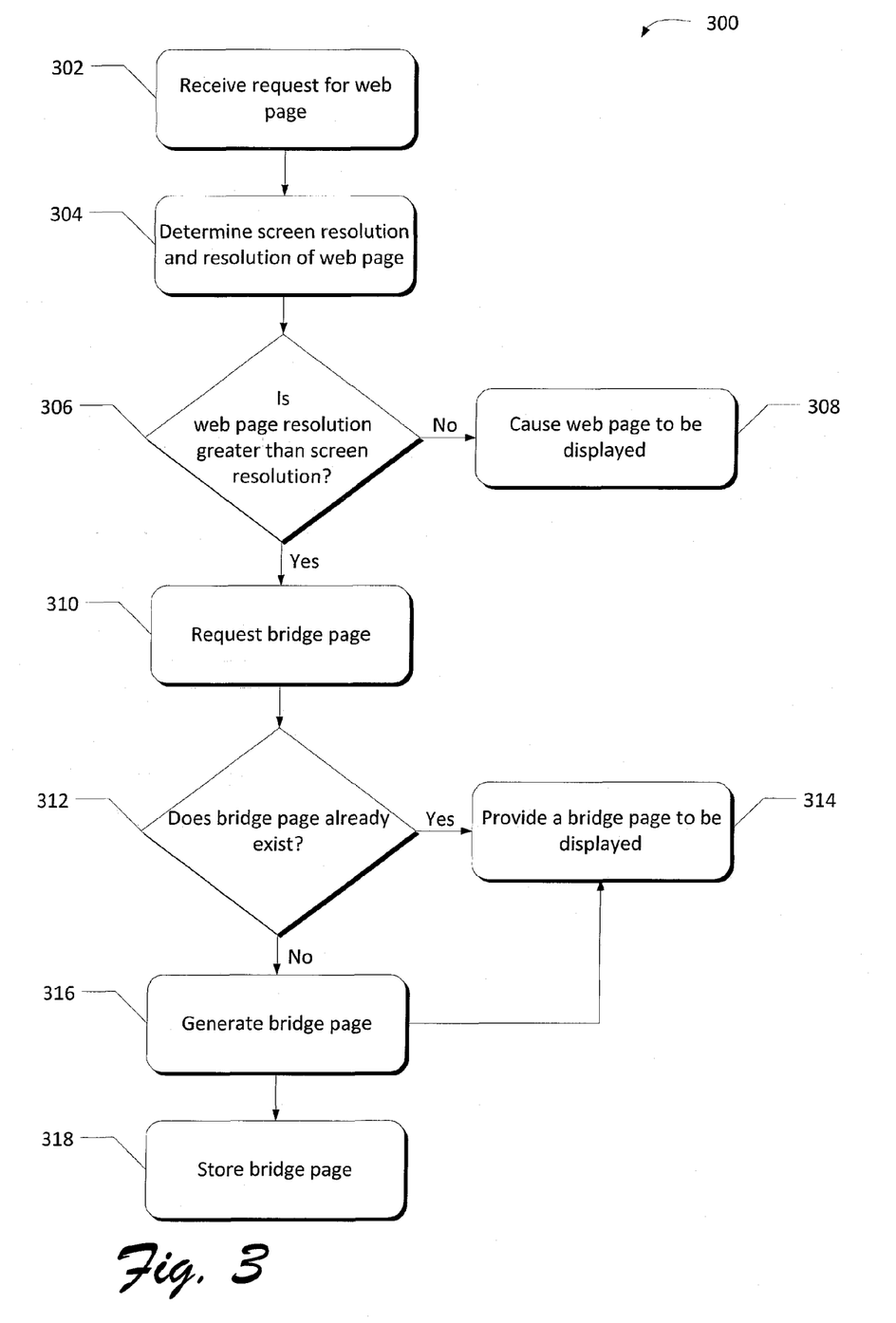
FIG. 3 illustrates an example process in accordance with one or more embodiments.

FIG. 3 is a flow diagram that describes steps in a method 300 in accordance with one or more embodiments. The method can be implemented in connection with any suitable hardware, software, firmware, or combination thereof. In at least some of the embodiments, the method can be implemented by an ad platform, such as ad platform server 104.

Block 302 receives a request for a web page. This can be performed in any suitable way. For example, ad platform server 104 can receive a request for a web page 124 hosted by advertiser server 106. The request for the web page can be generated by mobile device 102 subsequent to a user interacting with an ad banner associated with the web page.

Next, block 304 determines the screen resolution of the device from which the request was received and the resolution of the requested web page. This can be done in any suitable way. For example, ad platform server 104 can extract information included as part of the request that indicates the maximum resolution of display 120. Ad platform server 104 can extract information regarding the resolution of the requested web page from code for the web page, or it can assume that the resolution of the requested web page is a common web page resolution, e.g., 1024×768.

Block 306 determines whether the web page resolution is greater than the screen resolution. The system can, for example, compare the resolution of the requested advertiser web page and the resolution of the screen and determine if the resolution of the web page is greater than the resolution of the screen. If the answer is no (e.g., the resolution of the web page is less than or equal to the resolution of the screen), such as when a user requests the web page from a desktop computer, through a device with a high resolution screen, or when the web page has a resolution for mobile device display, block 308 causes the web page to be displayed. This can be done in any suitable way. For example, the ad platform server 104 can redirect the user device 102 to web page 124 hosted on advertiser server 106.

If, however, the web page resolution is greater than the screen resolution (e.g., a "yes" at decision block 306), block 310 requests a bridge page. This can be done in any suitable way. For example, ad publishing platform 122 can send a request to bridge page generating engine 132 for a bridge page associated with the requested web page 124.

Block 312 ascertains whether the bridge page already exists. This can be done in any suitable way. For example, bridge page generating engine 132 can search database 134 for a bridge page associated with the requested web page 124. If the bridge page already exists, block 314 causes the bridge page to be displayed. This can be done in any suitable way. For example, the ad platform server 104 can transmit information to enable the browser 114 to render bridge page 136.

If, however, the bridge page does not already exist, block 316 generates a bridge page. This can be done in any suitable way. For example, bridge page generating engine 132 can extract keywords or concepts from the web page 124 through various methods, such as parsing code associated with the web page, detecting information included in metadata, or locating headings or links within the web page. The bridge page generating engine 132 can then organize these extracted keywords or concepts into a bridge page with a resolution matching the screen resolution. For example, the bridge page generating engine 132 can utilize the extracted keywords or concepts to modify a template bridge page with the appropriate resolution to generate bridge page 136.

Next, block 314 provides the bridge page to be displayed. This can be done in any suitable way. For example, the ad platform server 104 can transmit information to enable the browser 114 to render bridge page 136. Block 318 stores the bridge page for future uses. This can be done in any suitable way. For example, bridge page 136 can be stored in database 134 to enable ad platform server 104 to provide the bridge page 136 to be displayed when a device requests web page 124 and the screen resolution does not match the resolution of the page.

In various embodiments, multiple bridge pages can be generated for each web page. For example, bridge pages with different resolutions can be generated for a single web page. In another example, a new bridge page can be created if the ad platform determines that an existing bridge page associated with the web page is out of date. This can be, for example, based on an elapsed time period since the generation of the bridge page, or responsive to receiving a notification that the web page includes new or modified content.

In some embodiments, a user will view a bridge page and, based on the summary of the web page presented by the bridge page, will decide to view the actual web page. For example, the bridge page can provide information that encourages the user to proceed to the web page, despite the resolution of the web page. In these instances, the web page can be presented to the user in response to the user indicating his desire to view the web page.

Figure 4:
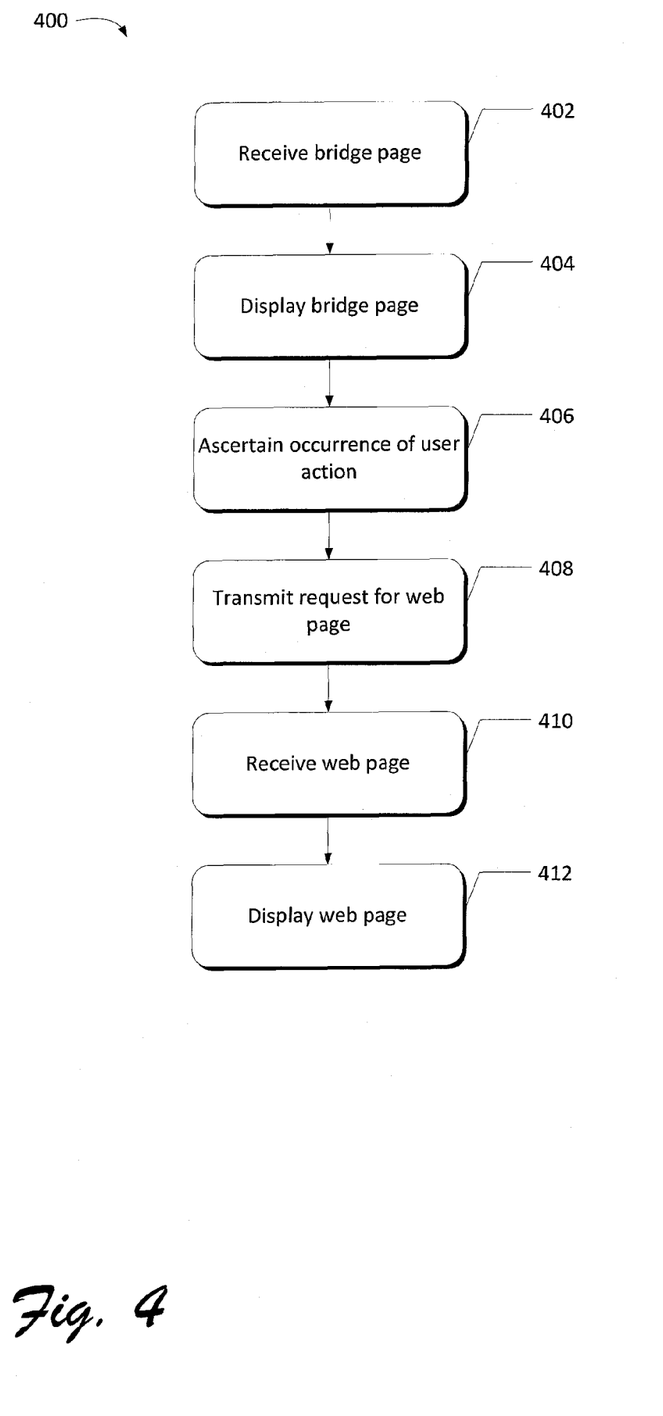
FIG. 4 illustrates an example process in accordance with one or more embodiments.

FIG. 4 is a flow diagram that describes steps in a method 400 in accordance with one or more embodiments. The method can be implemented in connection with any suitable hardware, software, firmware, or combination thereof. In at least some of the embodiments, the method can be implemented by a client device, such as mobile device 102.

Block 402 receives the bridge page to be displayed. This can be performed in any suitable way. For example, mobile device 102 can receive bridge page 136 from ad platform server 104 via network 108. Block 404 displays the bridge page. This can be performed in any suitable way, such as by rendering the bridge page 136 on display 120 within browser 114.

Block 406 ascertains the occurrence of a user action. This can be done in any suitable way. For example, upon viewing the bridge page and deciding to proceed to the web page, a user can provide input via an interaction with the bridge page presented on display 120 and the interaction can be sensed by the mobile device.

Block 408 transmits a request for the web page. This can be performed in any suitable way. For example, the user action ascertained by block 406 can be the clicking of a link that points to the web page included in bridge page 136. In response to the user action, mobile device 102 can transmit a request for web page 124 over network 108, and the request can be received by advertiser server 106. As another example, the mobile device 102 can transmit a request for web page 124 over network 108, and the request can be received by ad platform server 104.

Block 410 receives the web page. This can be done in any suitable way. In various embodiments, the mobile device 102 can receive the web page 124 from advertiser server 106 for display. In other embodiments, such as when block 408 transmits a request for the web page that is received by ad platform server 104, ad platform server 104 can cause browser 114 to be redirected to web page 124 hosted by advertiser 106, and the mobile device 102 can receive the web page 124 for display.

Block 412 displays the web page. This can be done in any suitable way. For example, web page 124 can be rendered in browser 114 and can be displayed on display 120.

In various described embodiments, ad platform server 104 does not host the target web page. Instead, the bridge page and the target web page are created and stored by different entities. For example, the bridge page can be generated and stored by the ad platform service, while the target web page can be generated and stored by the advertiser, As a result, in various embodiments, an advertiser can create a single web page to be provided in response to a user interaction with an ad banner, and users can be served any one of a variety of bridge pages suitable for display on the user device, each of the bridge pages being associated with and ultimately leading to the same target web page. This can provide a benefit to an advertiser in terms of cost savings because the advertiser can create one advertisement instead of multiple versions of the same advertisement, for example, a version of a web page to be viewed on a desktop and a version of the web page to be viewed on a mobile device. In addition, ad platform control of bridge pages can enable the ad platform service to enhance a user's experience. Having described displaying a bridge page corresponding to a target web page when the resolution of the user's device is less than the resolution of the target web page, consider now a description of an example system that can be used to implement one or more embodiments.

Example System

Figure 5:
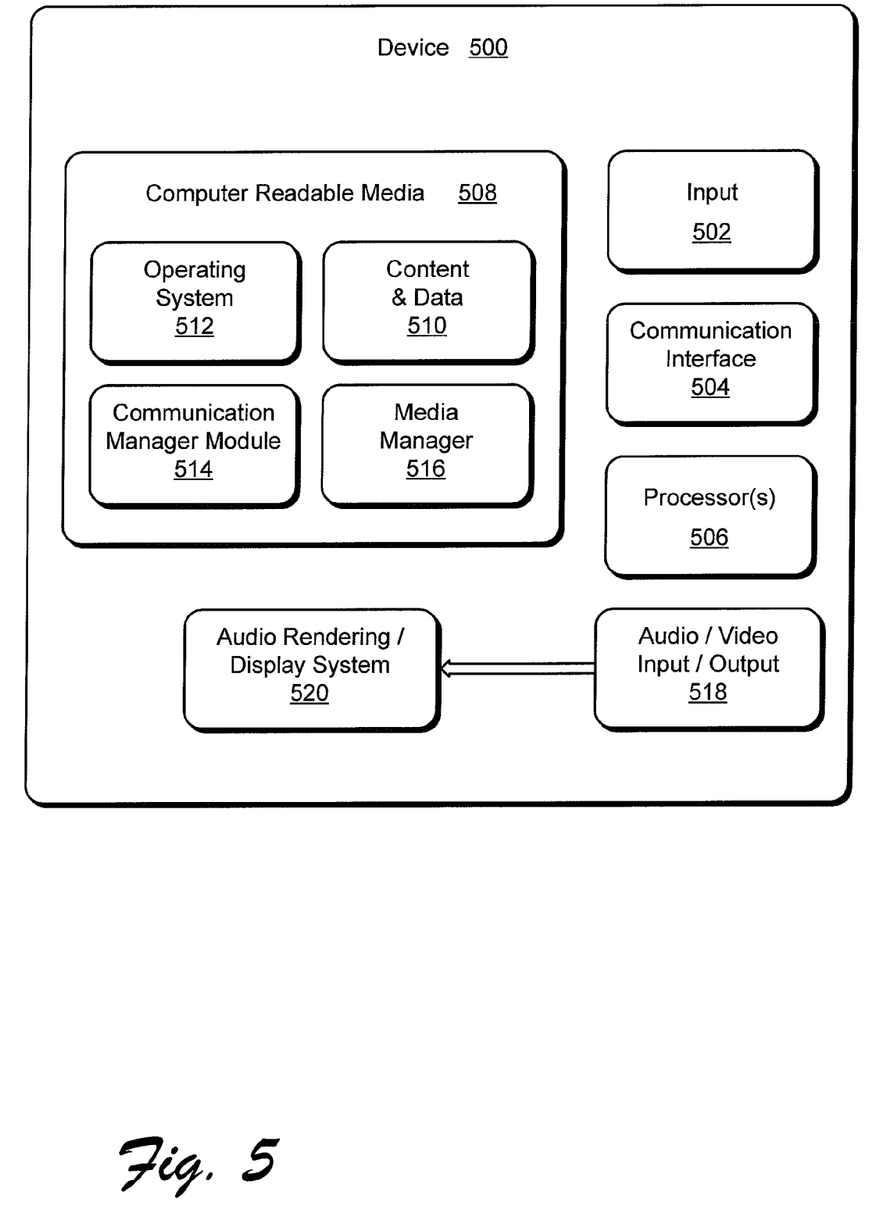
FIG. 5 is an illustration of an example device that can be used to implement one or more embodiments.

FIG. 5 illustrates various components of an example device 500 that can practice the embodiments described above. In one or more embodiments, device 500 can be implemented as a user device, such as mobile device 102 in FIG. 1.

Device 500 includes input device 502 that may include Internet Protocol (IP) input devices as well as other input devices, such as a keyboard. Device 500 further includes communication interface 504 that can be implemented as any one or more of a wireless interface, any type of network interface, and as any other type of communication interface. A network interface provides a connection between device 500 and a communication network by which other electronic and computing devices can communicate data with device 500. A wireless interface can enable device 500 to operate as a mobile device for wireless communications.

Device 500 also includes one or more processors 506 (e.g., any of microprocessors, controllers, and the like) which process various computer-executable instructions to control the operation of device 500 and to communicate with other electronic devices. Device 500 can be implemented with computer-readable media 508, such as one or more memory components, examples of which include random access memory (RAM) and non-volatile memory (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 508 provides data storage to store content and data 510 as well as device executable modules and any other types of information and/or data related to operational aspects of device 500. One such configuration of a computer-readable medium is signal bearing medium and thus is configured to transmit the instructions (e.g., as a carrier wave) to the hardware of the computing device, such as via the network 108. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 512 can be maintained as a computer executable module with the computer-readable media 508 and executed on processor 506. Device executable modules can also include a communication manager module 514 and a media manager 516 that can control executable modules such as game or other services that can employ advertisements to generate revenue. Communication manager module 514 can enable device 500 to communicate with various servers, such as servers providing ad banners or hosting bridge pages and web pages via communication interface 504.

Device 500 also includes an audio and/or video input/output 518 that provides audio and/or video data to an audio rendering and/or display system 520. For example, audio and/or video input/output 518 can cause an ad banner, a bridge page, and/or a web page to be displayed on audio rendering and/or display system 520. The audio rendering and/or display system 520 can be implemented as integrated component(s) of the example device 500, and can include any components that process, display, and/or otherwise render audio, video, and image data. The audio rendering and/or display system 520 can include functionality to cause ad banners, bridge pages, and/or web pages to be displayed to a user, such as on display 120. The display system can include information regarding the resolution of the screen, which can be transmitted from device 500 as part of other messages sent via communication interface 504.

In various embodiments, the device, via audio/video input/output 518 and/or input device 502 can sense a user interaction with the mobile device, such as when a user points to an ad banner or bridge page displayed by audio rendering/display system 520, and can transmit page requests or perform other actions responsive to such user interactions.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable storage devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A computer-implemented method comprising:
    receiving a request for a web page, the request comprising information regarding a resolution of a screen on which the requested web page is to be displayed;
    determining a resolution associated with the requested web page;
    comparing the resolution associated with the requested web page and the resolution of the screen on which the requested web page is to be displayed effective to determine if the resolution associated with the requested web page is greater than the resolution of the screen;
    responsive to determining that the resolution associated with the requested web page is greater than the resolution of the screen on which the requested web page is to be displayed, searching a database for a bridge page associated with the requested web page;
    responsive to searching the database for the bridge page and not finding the bridge page, generating the bridge page, the bridge page comprising a summary of the requested web page and generated dependent on the resolution of the screen on which the requested web page is to be displayed; and
    providing the bridge page for display instead of providing the requested web page.

2. The computer-implemented method of claim 1, further comprising:
    transmitting at least one ad banner, the ad banner being associated with at least one web page, wherein the request for the web page is received responsive to the at least one ad banner associated with the web page.

3. The computer-implemented method of claim 1, further comprising:
    responsive to providing the bridge page associated with the requested web page, receiving a second request for the web page; and
    causing the requested web page to be sent to a requestor of the web page.

4. The computer-implemented method of claim 3, causing the requested web page to be sent comprising causing a redirection to a server hosting the web page.

5. The computer-implemented method of claim 1, further comprising:
    causing a link to the web page to be sent to a requestor of the web page.

6. The computer-implemented method of claim 1, wherein said searching the database comprises searching the database on a server not hosting the web page.

7. The computer-implemented method of claim 1, determining the resolution of the requested web page comprising extracting information regarding the resolution of the requested web page from code for the web page.

8. The computer-implemented method of claim 1, generating the bridge page comprising:
    extracting one or more keywords or concepts from the web page; and
    utilizing the one or more keywords or concepts to modify a template bridge page effective to generate the bridge page.

9. One or more computer-readable storage media comprising instructions that are executable to cause a device to perform a process comprising:
    transmitting at least one ad banner, the ad banner being associated with at least one advertiser web page;
    responsive to transmitting the at least one ad banner, receiving a request for the advertiser web page associated with the ad banner, the request comprising information regarding a resolution of a screen on which the requested advertiser web page is to be displayed;
    determining a resolution associated with the requested advertiser web page;
    comparing the resolution associated with the requested advertiser web page and the resolution of the screen on which the requested advertiser web page is to be displayed effective to determine if the resolution associated with the requested advertiser web page is greater than the resolution of the screen;
    responsive to determining that the resolution associated with the requested advertiser web page is greater than the resolution of the screen, searching a database for a bridge page associated with the requested advertiser web page;
    responsive to searching for the bridge page and not finding the bridge page, generating the bridge page dependent on the resolution of a screen on which the requested advertiser web page is to be displayed; and
    providing the bridge page associated with the requested advertiser web page for display instead of the advertiser web page.

10. The one or more computer-readable storage media of claim 9, wherein generating the bridge page comprises generating the bridge page to have a resolution matching the resolution of the screen on which the requested advertiser web page is to be displayed, the bridge page comprising a summary of the requested advertiser web page.

11. The one or more computer-readable storage media of claim 10, the process further comprising:
    responsive to providing the bridge page associated with the requested advertiser web page, receiving a second request for the advertiser web page; and
    causing the requested advertiser web page to be sent to a requestor of the advertiser web page.

12. The one or more computer-readable storage media of claim 11, causing the requested advertiser web page to be sent comprising causing a redirection to a server that hosts the requested advertiser web page.

13. The one or more computer-readable storage media of claim 12 further comprising:
    storing the bridge page in a database, the database not being located on the server hosting the requested advertiser web page.

14. The one or more computer-readable storage media of claim 9, providing a bridge page associated with the requested advertiser web page for display comprising locating the bridge page associated with the requested advertiser web page in a database.

15. The computer-readable storage media of claim 9, determining the resolution of the requested advertiser web page comprising extracting information regarding the resolution of the requested advertiser web page from code for the web page.

16. The computer-readable storage media of claim 9, wherein generating the bridge page comprises:
- extracting one or more keywords or concepts from the requested advertiser web page; and
- utilizing the one or more keywords or concepts to modify a template bridge page effective to generate the bridge page.

17. A system comprising:
- one or more processors;
- one or more computer readable storage media having computer readable instructions stored thereon which, when executed, perform operations comprising:
- receiving a request for a web page, the request comprising information regarding a resolution of a screen on which the requested web page is to be displayed;
- comparing the resolution associated with the requested web page and the resolution of the screen on which the requested web page is to be displayed effective to determine if the resolution associated with the requested web page is greater than the resolution of the screen;
- responsive to determining that the resolution associated with the requested web page is greater than the resolution of the screen on which the requested web page is to be displayed, searching a database for a bridge page associated with the requested web page;
- responsive to searching the database for the bridge page and not finding the bridge page, generating the bridge page, the bridge page comprising a summary of the requested web page and generated dependent on the resolution of the screen on which the requested web page is to be displayed; and
- providing the bridge page for display instead of providing the requested web page.

18. The system of claim 17, further comprising:
- responsive to providing the bridge page associated with the requested web page, receiving a second request for the web page; and
- causing the requested web page to be sent to a requestor of the web page.

* * * * *